C. MORRIS.
Rocket.

No. 218,394.  Patented Aug 12, 1879.

Witnesses:
J. C. Wilke
Wm Sherburne

Inventor:
Charles Morris
by Sherburne & Co
Attorneys

UNITED STATES PATENT OFFICE.

CHARLES MORRIS, OF CHICAGO, ILLINOIS.

IMPROVEMENT IN ROCKETS.

Specification forming part of Letters Patent No. 218,394, dated August 12, 1879; application filed January 31, 1879.

*To all whom it may concern:*

Be it known that I, CHARLES MORRIS, of Chicago, in the county of Cook and State of Illinois, have invented certain new and useful Improvements in Sky-Rockets; and I do hereby declare the following to be a full, clear, and exact description thereof, which will enable others skilled in the art to which this invention appertains to make and use the same, reference being had to the accompanying drawings, forming part of this specification, in which—

Figure 1:
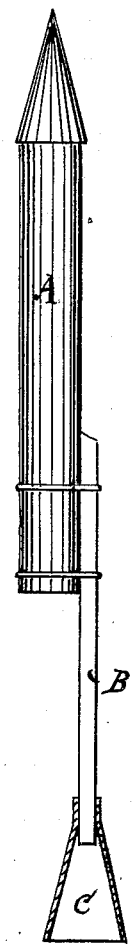
Figure 2:
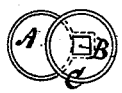
Figure 3:
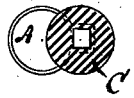

Figure 1 represents a side view of a sky-rocket embodying my said invention. Fig. 2 represents a rear-end elevation of the same. Fig. 3 shows a modification.

Like letters of reference indicate like parts.

Heretofore, in the manufacture of sky-rockets, it has been necessary to make the shaft of a great length, in order that its friction while passing through the air would hold the rocket so as to cause it to move in a straight line, therefore making the rockets expensive to make, also expensive to ship, owing to the great amount of space necessary.

It is to overcome these difficulties that my invention is designed; and it consists in shortening the shaft of the rocket and providing its rear end with a cone or other suitable-shaped balance, of such a size that its friction against the air will cause the rocket to move in a straight line, as hereinafter described and claimed.

In the accompanying drawings, A represents the rocket proper, and B the shaft, which are connected together in the usual manner. This shaft is made about one-third the length of the shaft heretofore used, and is provided at its rear end with a conical or other suitable-shaped balance, permanently attached thereto.

The balance C may be made of paper, wood, or any other suitable material, and is slightly greater in diameter at the rear end than the diameter of the rocket proper, the object of which is to increase its friction against the air when moving forward, so as to cause the rocket to move in a straight line.

In Fig. 2 of the drawings I have shown the balance made hollow; but I do not intend to limit myself to this form of construction, as I do sometimes make the same solid, as shown in Fig. 3.

Having thus described my invention, what I claim as new, and desire to secure by Letters Patent, is—

In a sky-rocket, the combination, with the short shaft B, of the conical balance C, substantially as and for the purpose specified.

The above specification of my invention signed by me this 28th day of January, A. D. 1879.

CHARLES MORRIS.

Witnesses:
J. W. MERRIAM,
THOMAS BOYLE.